T. OLIVER.
Tailors' Measure.
No. 3,024.
2 Sheets—Sheet 1.
Patented March 30, 1843.
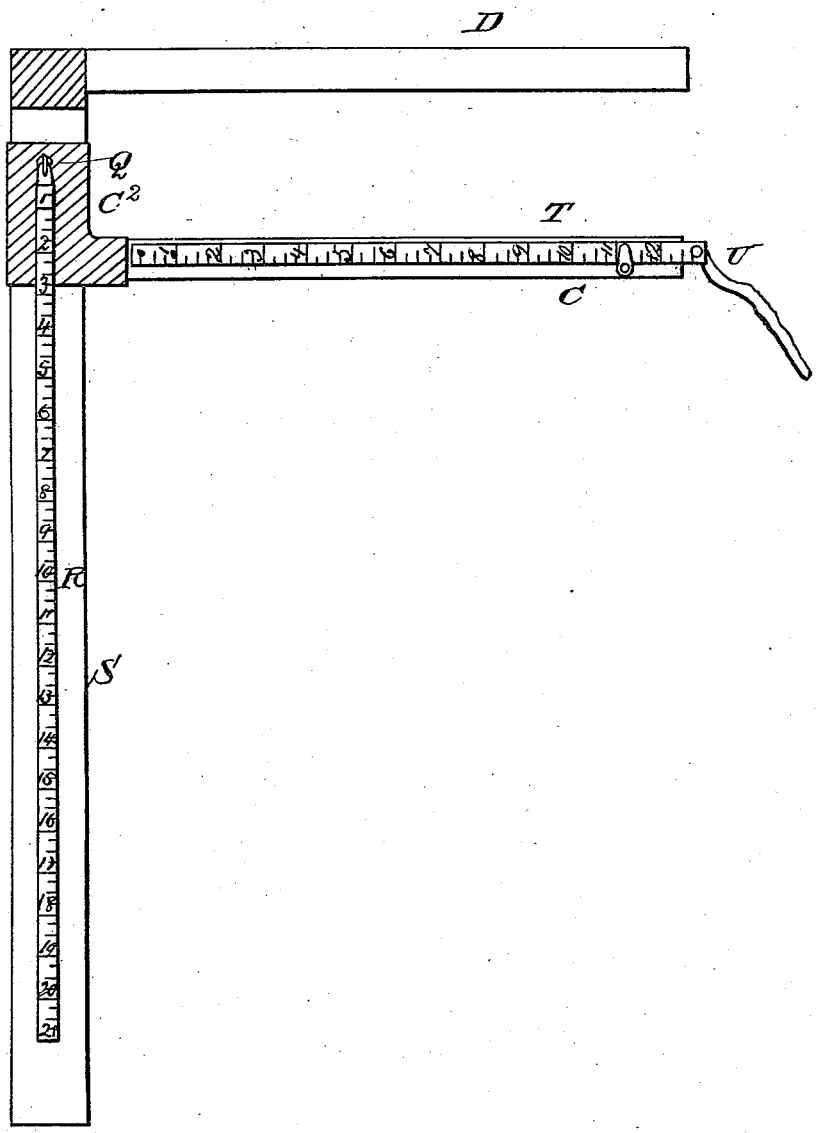

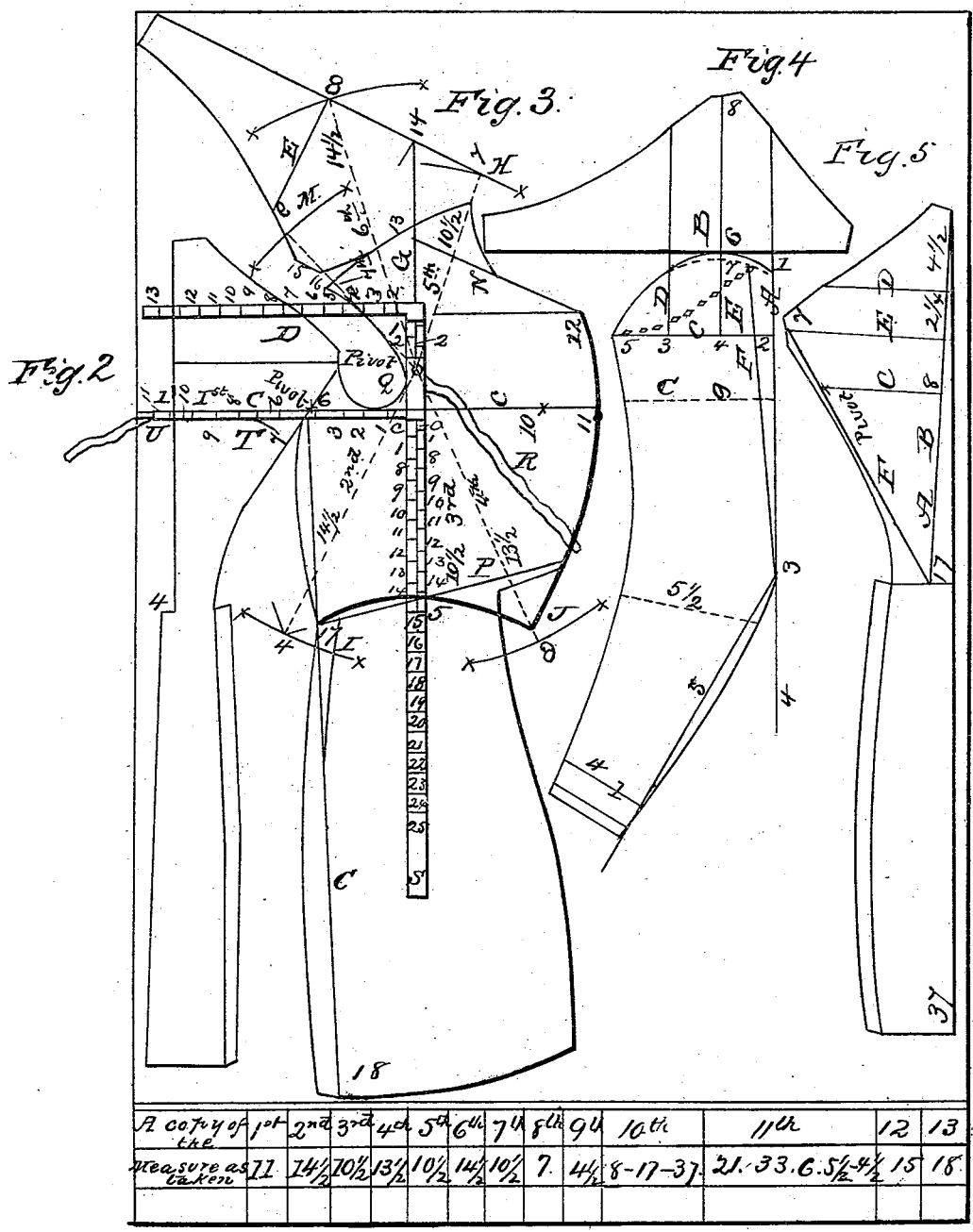
T. OLIVER.
Tailors' Measure.
No. 3,024.
2 Sheets—Sheet 2.
Patented March 30, 1843.

UNITED STATES PATENT OFFICE.

THOMAS OLIVER, OF NEW YORK, N. Y.

TAILOR'S MEASURE.

Specification of Letters Patent No. 3,024, dated March 30, 1843.

*To all whom it may concern:*

Be it known that I, THOMAS OLIVER, of the city of New York, in the county of New York and State of New York, have invented a new and useful Apparatus for Measuring and Drafting Garments; and I do hereby declare that the following is a full description of the apparatus as represented by the annexed drawings, making part of this specification.

Figure 1 is a view of the back side of the square and slide; Fig. 2 is a view of the front or graduated sides of the slide; Figs. 3, 4, 5 diagrams showing the method of drafting garments.

A part of the apparatus used consists of a common square S marked with inches, &c., to which is attached a slide C which is a movable or sliding arm, the same in width and length as the short arm D of the square; underneath this slide C there is attached by rivets a steel strap T marked with inches to correspond with the inches on the front of the slide C, see Fig. 2, Plate 2; the object of this steel strap is to ascertain the correct bottom and front of the scye. A pivot Q is placed on this slide two inches up from the bottom and one inch in from the front of the arm. On this pivot a common tape measure R is attached from which the measures are taken of the different parts of the body.

In taking the measure the short arm D of the square S is placed on the shoulder; the slide C is pressed close up underneath the arm of the person to be measured, which gives the correct level of the depth of scye, and the thickness through the arm, which is used in getting the pitch of the shoulder from 14 to 7 on draft, see Fig. 3, which throws the shoulder forward or back according as the person is crooked or erect. While the square is thus placed on the person the steel strap T is pressed around underneath the arm which gives the level of the depth of the scye (on back) and at the same time determines the distance from the front of scye to the center of back.

There is attached to the end of the steel strap T a button U on which can be attached a measure or a strap of any kind and which may be brought around underneath the arm and placed underneath the measure on the blade bone of the person which keeps the measure stationary until all the measures are taken. The measures are now taken from the pivot Q at the front of scye to the different parts of the body as represented on draft.

The connection of the slide with the square is effected by means of a metallic plate $c^2$ bent around three sides of the long arm of the square and fastened at its two extremities to the graduated part C of the slide forming a mortise at the inner end of said graduated part of the slide corresponding in form to the cross section of the long arm of the square.

Your petitioner claims to be the inventor of the flexible graduated strap in combination with the slide on the square—the peculiarities of which consisting in the getting of the correct depth of scye and pitch of shoulder—together with the placing of the pivot Q and tape measure R on the slide in front of scye, from which straight measures are obtained of the different parts of the body, which obviates the difficulty heretofore experienced of taking the measures underneath the arm which by taking them on round surfaces and applying them on straight lines give the points too long in the usual practice of drafting garments.

Therefore what I claim as my invention and which I desire to secure by Letters Patent is—

The combination of the graduated flexible strap T with the slide C and square S as described—the pivot Q and tape R being attached to the slide in front of the position of the scye.

THOMAS OLIVER.

Witnesses:
 EDMUND MAHER,
 A. E. JOHNSON.